United States Patent [19]

Rutenbeck et al.

[11] Patent Number: 5,288,453
[45] Date of Patent: Feb. 22, 1994

[54] METHOD FOR FORMING DOUBLE WALLED INTEGRAL HINGE MEMBERS IN BLOWMOLDED PLASTIC ARTICLES

[75] Inventors: Mark M. Rutenbeck; Steven W. Neff, both of Clinton, Iowa

[73] Assignee: Custom Pak, Incorporated, Clinton, Iowa

[21] Appl. No.: 974,495

[22] Filed: Nov. 12, 1992

[51] Int. Cl.$^5$ ............................................. B29C 49/04
[52] U.S. Cl. ........................................ 264/531; 264/545; 425/525
[58] Field of Search ............... 264/523, 531, 534, 540, 264/516, 515, 545; 425/525, 532

[56] References Cited

U.S. PATENT DOCUMENTS

| | | |
|---|---|---|
| 2,577,350 | 12/1951 | Morin . |
| 3,025,947 | 3/1962 | Hammer . |
| 3,373,892 | 3/1968 | Landen . |
| 3,452,391 | 7/1969 | Langecker ..................... 264/531 |
| 3,456,913 | 7/1969 | Lutz . |
| 3,655,849 | 4/1972 | Hayashi . |
| 3,886,645 | 6/1975 | Schurman ..................... 264/540 |
| 4,016,230 | 4/1977 | Michel . |
| 4,029,234 | 6/1977 | Johnson, Jr. et al. ........... 264/540 |
| 4,294,299 | 10/1981 | Dorsen . |
| 4,382,058 | 5/1983 | Watson et al. ................ 264/531 |
| 4,445,623 | 5/1984 | Kolling . |
| 4,558,799 | 12/1985 | Hammond . |
| 4,615,464 | 10/1986 | Byrns . |
| 4,877,394 | 10/1989 | McFarlane . |
| 5,051,084 | 9/1991 | Guarriello . |

FOREIGN PATENT DOCUMENTS 49-41111 11/1974 Japan ........................................ 264/531
61-195821 8/1986 Japan ........................................ 264/523

Primary Examiner—Catherine Timm
Attorney, Agent, or Firm—Thomas J. Greer, Jr.

[57] ABSTRACT

A die construction for forming integral hinges (60) for a blow molded carrying case. An edge of the main cavity of a lower die (12) of a blow molding die pair is provided at one peripheral wall portion (40) with sloping channels (38). A core pin (32) extends across and spans the sloping channels. The upper die (10) is provided at one peripheral portion with semi-cylindrical recesses (22) coaxial with the core pin and of the same length as the width of the sloping channel. A heated parison (46, 48) is placed (FIG. 1) between the two dies. With die closing and with the introduction of pressurized air (52) into the parison, the parison is deformed. At the same time, the pressurized air also causes one of the plastic parison sheets (46) of the parison to deform into the semi-cylindrical recess, and the other parison sheet (48) to deform into the sloping channel and also around the core pin. The two parison sheets fuse together around the core pin upon complete closing of the two dies (FIG. 3) to form a hinge boss (60) integral with the remainder of the parison sheets which form a carrying case half. The core pin (32) is then removed, to form a hinge pin recess through the hinge boss. Any number of such hinge bosses may be formed, with a single core pin spanning each sloping channel and each semi cylindrical recess. This construction and method obviates the need to subsequently drill hinge pin receiving holes (61) through the hinge bosses (60).

6 Claims, 3 Drawing Sheets

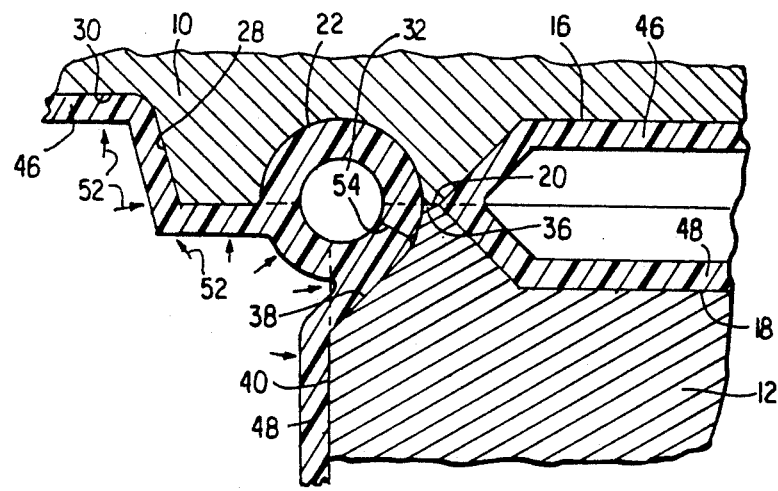
FIG. 3
FIG. 4
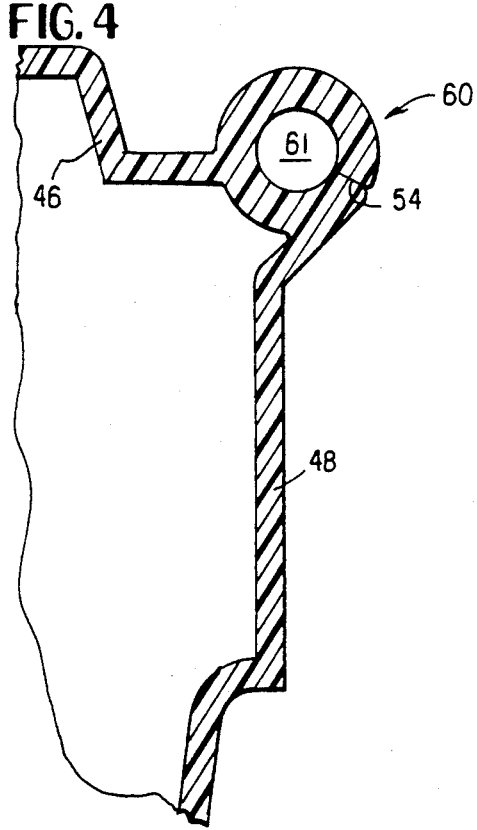
FIG. 5
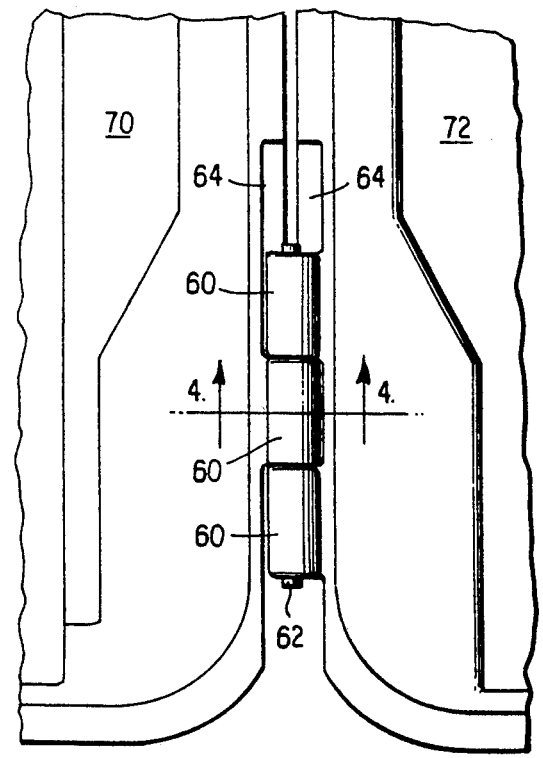

METHOD FOR FORMING DOUBLE WALLED INTEGRAL HINGE MEMBERS IN BLOWMOLDED PLASTIC ARTICLES

BACKGROUND OF THE INVENTION

This invention relates to blow molding and more particularly to a mold or die construction, particularly adapted for blow molding, wherein an integral hinge is formed on either or both of two halves of a hinged blow molded carrying case or panel assembly.

Blow molding is a technique for producing molded articles of plastic materials and is usually carried out by placing a parison (a tube of heated plastic) between two dies. Upon aligning the dies, such as a male and female die, pressurized air is introduced into the parison, with the parison expanding so as to conform to the shape of the mold cavity defined by the two mating dies. The resultant product or article is a hollow wall structure, the walls being joined at the periphery of the article.

Usually the two halves of a blow molded carrying case are joined by a hinge or series of hinges along respective edges, with the case edges opposite the hinges carrying one or more latches to secure closure. Typically, the hinges are often formed by molding them integrally with respective carrying case halves, and then drilling holes or bores through them, with the holes of the several hinge bosses being aligned so as to accept a hinge pin. U.S. Pat. No. 4,615,464 issued Oct. 7, 1986 to James E. Byrns, incorporated by reference, illustrates a carrying case having two blow molded halves coupled by hinges. However, the hinges must be drilled after the molding operation to provide bores for the hinge pins. The requirement for subsequent drilling after formation of the hinge bosses adds expense to the manufacturing process.

SUMMARY OF THE INVENTION

According to the practice of this invention, otherwise conventional dies for forming a blow molded article, such as half of a hinged carrying case or panel assembly, are provided with a plurality of hinge forming cavities, the number of which corresponds to the number of hinges for the article. An edge portion of one die includes a semi-cylindrical recess. A slanted channel recess is provided near an edge of the other die half. A core pin passes across these two recesses which together form each hinge forming cavity. When the two dies are closed and aligned, each cavity is substantially cylindrical, and has an opening or entrance portion, with the core pin passing through each cavity, roughly in its center. In the molding process, a heated parison is placed between the two dies, the dies closed, and pressurized air is introduced into the parison. The parison is deformed to assume the shape of the cavity defined by the mating dies, with one of the parison sheets being deformed into the partial semi-cylindrical recess, and the other parison sheet deformed around the core pin. The two parison sheets fuse together around the core pin to form a hinge boss integral with both sheets of the parison. The core pin is then removed to define openings through the hinge bosses for a hinge pin.

BRIEF DESCRIPTION OF THE DRAWINGS

FIG. 3 is a view similar to FIG. 2 and illustrates a later stage in the molding process, with the two dies having been placed fully together, and the parison pressurized.

FIG. 4 is a partial cross section of a blow molded article, such as a carrying case half, showing the integral hinge of this invention having a hinge pin recess or bore formed therein, the Figure taken along section 4—4 of FIG. 5.

FIG. 5 is a partial view plan of a typical blow molded hinged carrying case in its fully open configuration provided with the integral hinges of this invention.

DETAILED DESCRIPTION OF THE INVENTION

Figure 1:
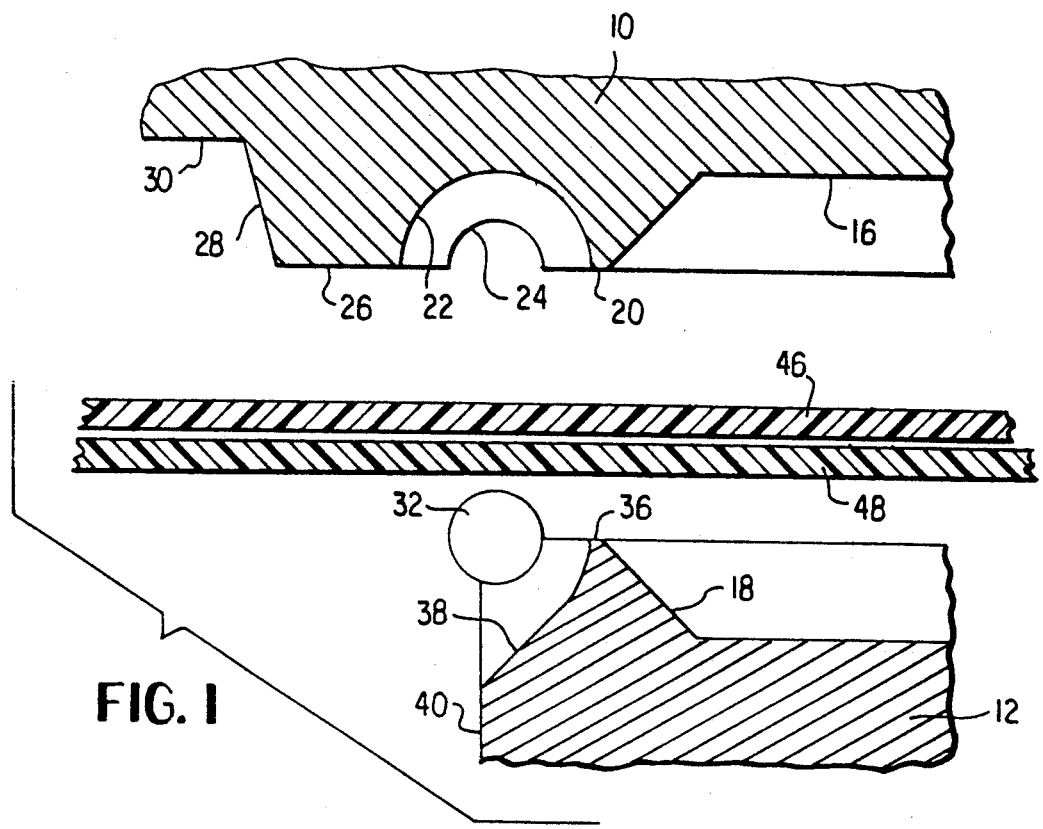
FIG. 1 is a partial cross sectional view of two die halves provided with the integral hinge cavity producing recess of this invention, in combination with two sheets of a heated parison.
Figure 2:
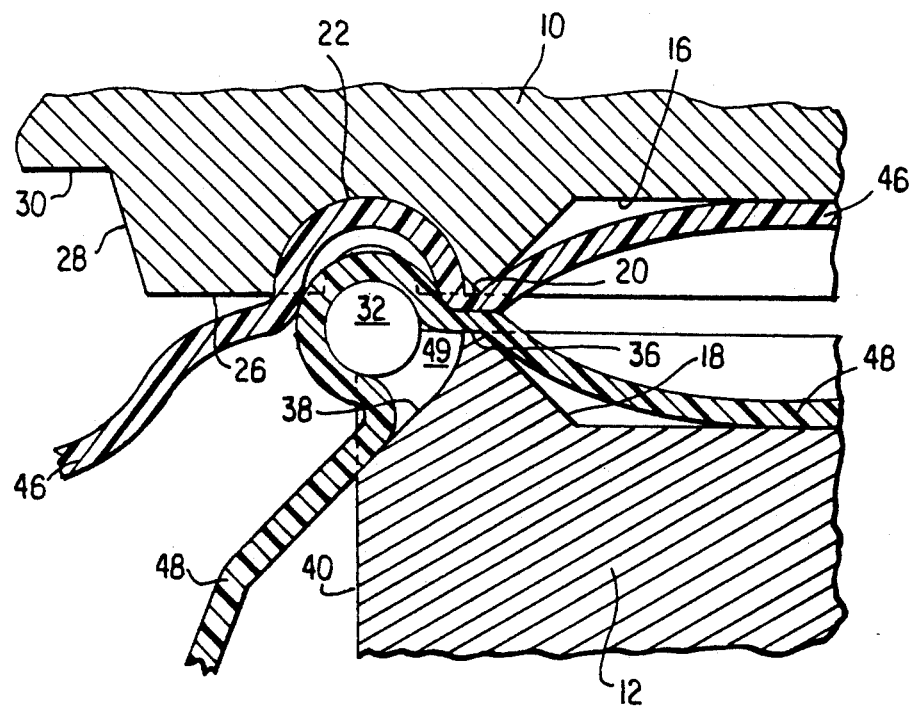
FIG. 2 is a view similar to FIG. 1, illustrating the dies having been brought closer together and causing air trapped inside the parison to partially expand the parison.

Referring now to FIGS. 1 to 3 of the drawings, FIG. 1 illustrates an upper blow molding die 10 and a lower blow molding die 12. While shown as upper and lower for ease of description, it will be understood that in practice dies 10 and 12 often lie in vertical planes and are moved horizontally towards and away from each other during the blow molding process. Die 10 includes a flash recess 16 adapted to mate with a corresponding flash recess 18 of die 10. When the dies are closed, recesses 16 and 18 define a single cavity for receiving flash (excess plastic sheet material to be discarded). It will be understood that this flash cavity is known in the blow molding die art and forms no part of the invention. Flash cut off abutment portion or edge 20 of die 10 lies adjacent and borders a generally semi cylindrical recess 22, each end of the recess communicating with core pin receiving semi-circular grooves 24. Substantially vertically extending die surface portion 28 borders rim area 26 of the main cavity in die 10. This main cavity typically includes a male core.

Flash cut off abutment surface edge 36 of die 12 corresponds to abutment surface portion 20 of die 10, with a slanting channel recess 38 extending from flash abutment edge 36 to vertically extending wall portion 40 of die 12. Wall portion 40 borders the main molding cavity in die 12. A cylindrical core pin 32 spans each channel 38, the core pin being axially movable, parallel to its own longitudinal axis, as will later be explained with reference to FIG. 6.

A parison, usually heated, (the dies may be cooled or heated), having two parallel walls or sheets 46 and 48 (when the parison is collapsed) is placed between the two dies, between core pin 32 and semi-cylindrical recess 22. The dies are moved together to close them and a source of pressurized air (which may be cooled or heated) designated by arrows 52 in FIG. 3, is blown into the parison, with the parison expanding and deforming so as to conform to the contour of the main mold cavity, as bordered by wall portions 40 of die 10 and 28 of die 12. Pressurized air 52 also forces upper parison sheet 46 into conformity with semi-cylindrical recess 22. Concurrently, the pressurized air forces lower parison sheet 48 to bend around core pin 32. As shown at FIG. 2, there is a gap 49 between the nearest segments of parison sheet 48 at one stage during the die closing. Upon closing the mold halves completely, and pressurizing the parison as shown at FIG. 3, gap 49 has vanished, with the nearest portions of parison sheet 48 around core pin 32 merging with material that is forced from the area between semi cylindrical recess 22 and core pin 32, as indicated at 54 of FIG. 3. Flash cut off abutment surfaces 20 and 36 have now met and have cut through the excess parison material. This excess remains in the flash receiving chamber defined by recesses 16 and 18, again as shown at FIG. 3, and is later discarded. The air trapped within the parison may not cause such a full distortion of sheets 46 and 48 as that shown at FIG. 2. FIG. 2 is presented to show the parison configuration at one time during the process of forming the integral hinge boss.

Core pin 32 is now removed by withdrawing it along its own longitudinal axis to form a hinge or hinge boss 60 having a hinge pin receiving bore 61 therein. Parison sheets 46 and 48 have fused together, as shown at FIG. 3, so that hinge 60 is integral with whatever double walled (blow molded) product is formed. The thickness of parison sheets 46 and 48 is typically 0.08 inches, while the thickness of the hinge boss or cylinder 60 is typically 0.094 inches. Essentially the same result can be achieved using a variety of wall thicknesses and hinge boss diameters.

FIG. 4 illustrates a typical hinge boss or cylinder 60 with a bore therein after core pin 32 has been removed and after the parison has been formed into a carrying case or panel assembly half, the latter including a side wall and edge walls, and removed from the dies.

FIG. 5 is a partial plan view of a hinged blow molded carrying case or panel assembly having the usual halves 70 and 72, with a hinge pin 62 extending through the bores of respective bosses 60. This view is somewhat similar to FIG. 1 of the noted U.S. patent to Byrns. As seen at FIG. 5, depressions 64, one in each case half 70, 72, are opposed to each other. The left or longer depression 64 may be omitted if desired.

FIGS. 1 to 3 show the core pin positioned at the top of an imaginary extension of edge 40 of die 12. As seen at FIGS. 1-3, the longitudinal axis of pin 32 is substantially coincident with the longitudinal axes of channel 38 and semi-cylindrical recess 38 in the die closed configuration.

Figure 6:
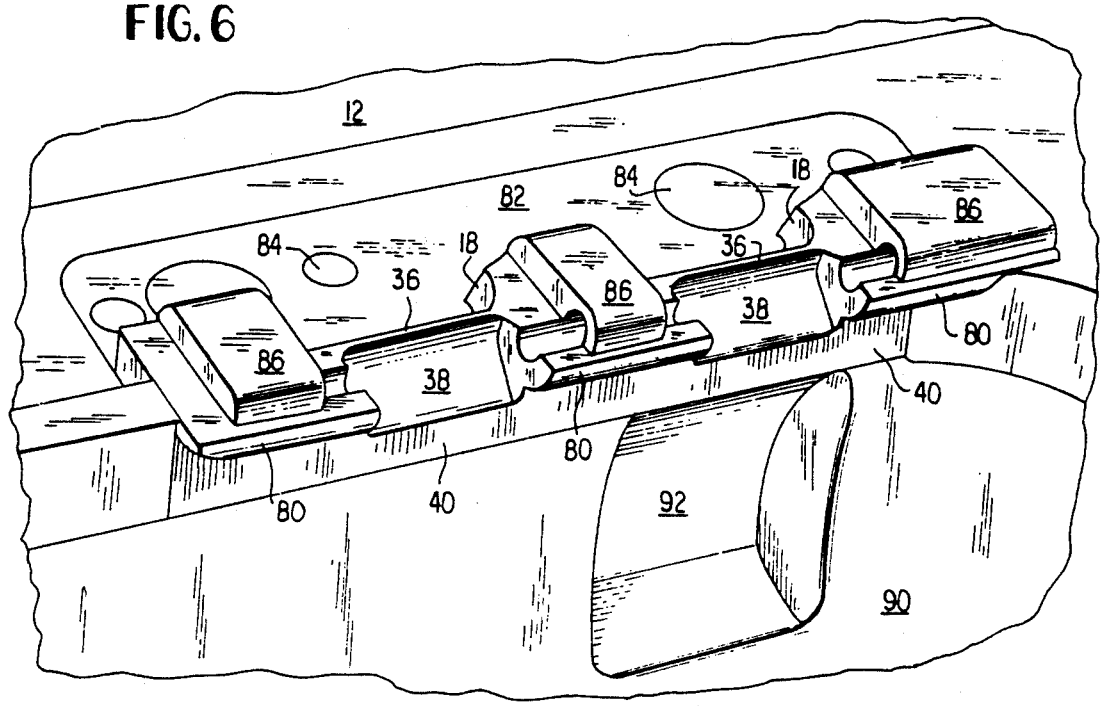
FIG. 6 is a partial perspective view of the lower die of FIGS. 1 to 3.
Figure 7:
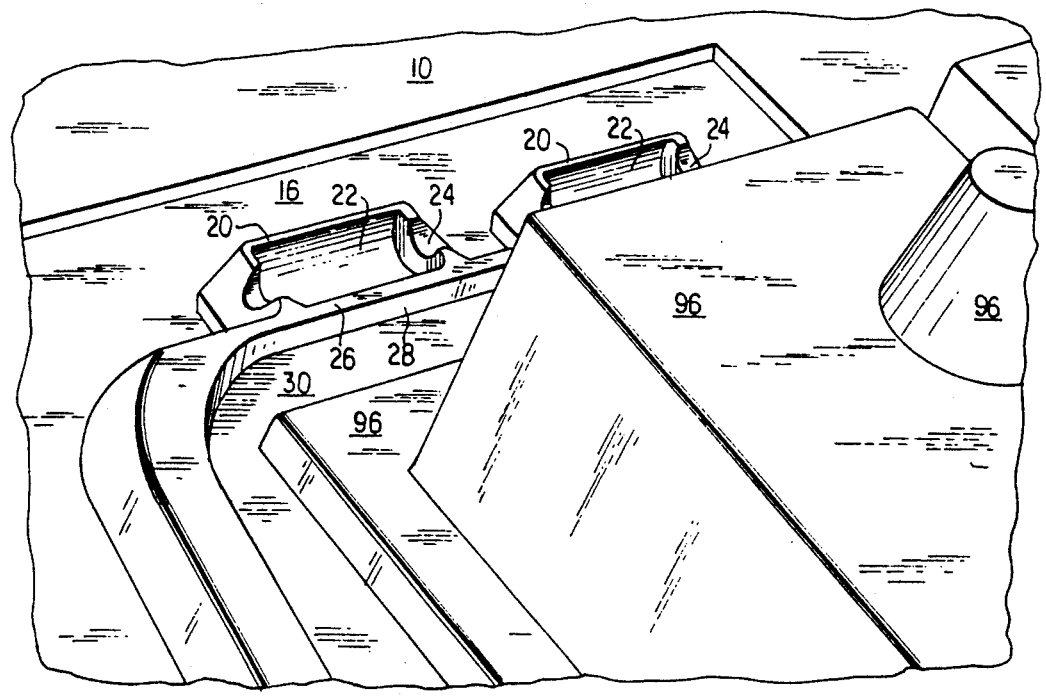
FIG. 7 is a partial perspective view of the upper die of FIGS. 1 to 3.

Referring now to FIGS. 6 and 7 of the drawings, one section of the lower die 12 is shown in perspective at FIG. 6. There are two such sections along an edge of the lower die, one for each section for forming two spaced hinge assemblies of the blow molded case, such as the two spaced hinge assemblies 20, 20 of FIG. 1 of the noted U.S. Pat. No. 4,615,464 to Byrns.

As will be apparent from the description to follow, FIGS. 1-3 may be considered as sectional views taken transversely of the longitudinal axis of either of the channels 38 of die 12 and its corresponding semi cylindrical recess 22 of die 10.

Recesses 22 and channel grooves 38 are pairwise aligned, each pair forming a hinge 60 shown at FIG. 4, the hinge formed by the previously described steps.

At FIG. 6, three part cylindrical core pin lower guides 80 are positioned between channels 38 and are integral with an insert 82, the latter located in a recess cut out of an edge portion of lower die 12. Circles 84 represent covers for bolts or the like which secure insert 82 to die 12. Upper part cylindrical guides 86, also integral with insert 82, are located above guides 80, with the complete cylindrical recess defined by respective pairs of guides 80, 86 defining a recess or bore for receiving core pin 32 shown at FIG. 2. Core pin 32 is axially movable in the three bores, the core pin being introduced from the right of the right most guide pair 80, 86 of FIG. 6. The tip or end of core pin 32 rests within the bore defined by the left most guide pair 80, 86 of FIG. 6 during the hinge forming process illustrated at FIGS. 1-3. After hinges 60 are formed, core pin 32 is removed by sliding it towards the right of FIG. 6. Main cavity 90 of die 12 may be provided at its side walls with one or more recesses 92 for forming a protrusion on the external surface of a blow molded core half formed by dies 10 and 12, such as case halves 2 or 4 of the noted Byrns patent. It is seen that vertical wall 40 merges with the vertically extending portion of cavity 90. Optionally, die 12 has another set of channels 38 and guides 80, 86 along its main cavity edge for forming a second set of hinges.

Turning now to FIG. 7, two semi-cylindrical recesses 22 each having a semi-circular opening 24 at each end thereof, are located on that side of rim area 26 opposite from the main mold cavity of upper die 10. Die 10 optionally has another such pair of recesses 22 along another rim area of the die, for forming a second pair of hinges. One longitudinal side of each recess 22 is bordered by edge 20. Edges 20 of recesses 22 and edges 36 of grooves 38 (FIG. 6) cooperate to pinch off flash, as shown at FIG. 3. The main cavity of die 10 is provided with core members denoted as 96, such core members being of known form and construction and forming no part of this invention. Dies 10 and 12 thus each have a generally concave central or main molding cavity, with die 10 provided centrally with a male core member 96.

Each hinge boss molding cavity defined by recesses 22 and channels 38 is shown as semi-cylindrical at its upper portion and slanting at its lower portion. This configuration, along with round core pin 32, yields a generally cylindrical hinge boss 60 having a bore 61 therethrough, from one end of each hinge boss to the other end, as seen at FIGS. 4 and 5. However, it will be apparent that the shape of the upper hinge molding cavity 22 could be semi ellipsoidal or semi spherical or some other curved shape to yield a hinge boss 60 of either convex or concave form. Further, the substantially flat groove or channel shape 38 may be varied. It will further be apparent that the hinge boss 60 may be square, hexagonal, or of other polygonal shape in transverse cross section, as distinguished from being curved in transverse cross section as shown.

The steps shown at FIGS. 1 to 3 of placing the parison between recess 22 in the upper die 10 and the upper portion of core pin 32, partially closing the dies, introducing pressurized air 52 between parison sheets 46 and 48, thereby causing the upper parison sheet 46 to enter and conform to the shape of upper recess 22, and thereby causing the lower parison sheet 48 to both enter the space between core pin 52 and the bottom of channel 38 and also to become wrapped around the core pin, are all seen to be substantially independent of the specific shape of recess 22 and channel 38. Thus while the preferred configuration of the hinge boss molding cavity defined by the two recesses shown at FIG. 3 in dies 10 and 12 is substantially cylindrical, other hinge boss forming cavity configurations are within the scope of the invention.

The partial wrapping around of parison sheet 48 on core pin 32 has been shown and described with respect to relatively thin parison sheets 46 and 48 compared to the diameter of core pin 32 and the distance from channel 38. However, if relatively thick parison sheets 46 and 48 are employed with the die apparatus of this invention, the wrapping around action due to pressurized air 52 would not occur. Nevertheless, the same end result would be obtained. Namely, the mass of the parison sheets would be distorted into recess 22 and channel 38 around core pin 32 to, again, yield an integral hinge boss 60 as shown at FIGS. 3 and 4. Pressurized air 52 would still be employed to deform the parison against the interior of the dies.

Geometrical terms of orientation such as upper, lower, vertical and the like are used to facilitate the description, and are not intended as terms of limitation.

We claim:

1. A method of blow molding a hinge boss having a bore therethrough, the hinge boss being integral with a blow molded article formed from a parison, including the steps of, inserting a parison having upper and lower sheets between first and second blow molding dies so a portion of the sheets are between a recess in the first blow molding die and a core pin adjacent to the second blow molding die, closing said dies, introducing pressurized air into the parison, causing a portion of the upper parison sheet to deform into the recess in the first blow molding die, causing a portion of the lower parison sheet to deform around and be in contact with the core pin and into a channel in the second blow molding die, the recess and the channel being aligned, the channel being spanned by the core pin, causing the portion of the lower parison sheet to fuse together with itself in the channel and around the core pin, withdrawing the core pin, to thereby form a hinge boss having a bore therein.

2. The method of claim 1 wherein said recess in the first die is semi-cylindrical.

3. The method of claim 1 wherein said channel in the second die is rectangular.

4. A method of blow molding a hinge boss having a bore therethrough, the hinge boss being integral with a blow molded article formed from a parison, including the steps of inserting a parison having upper and lower sheets between first and second blow molding dies, closing said dies, introducing pressurized air into the parison, causing a portion of the upper parison sheet to deform into a recess in the first blow molding die, causing a portion of the lower parison sheet to deform around and be in contact with a core pin and into a channel in the second blow molding die, the recess and the channel being aligned, the channel being spanned by the core pin, causing the portion of the lower parison sheet to fuse together with itself in the channel and around the core pin, causing the portion of the upper parison sheet to deform around and fuse to that portion of the lower parison sheet which deforms around the core pin, withdrawing the core pin, to thus form a double sheet thickness integral hinge boss having a bore therein.

5. The method of claim 4 wherein said recess in the first die is semi-cylindrical.

6. The method of claim 4 wherein said channel in the second die is rectangular.

* * * * *